Sept. 27, 1955 L. SCHWEITZER 2,718,664
APPARATUS FOR SETTING THE GLASS IN ITS FRAME
Filed Jan. 3, 1950
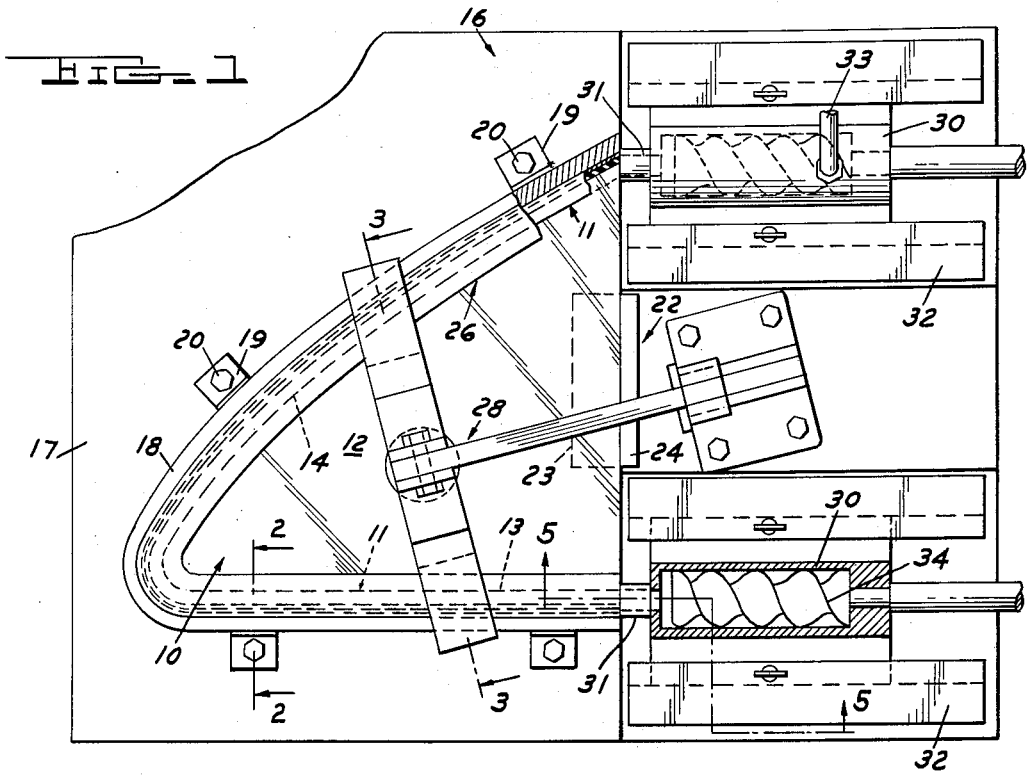
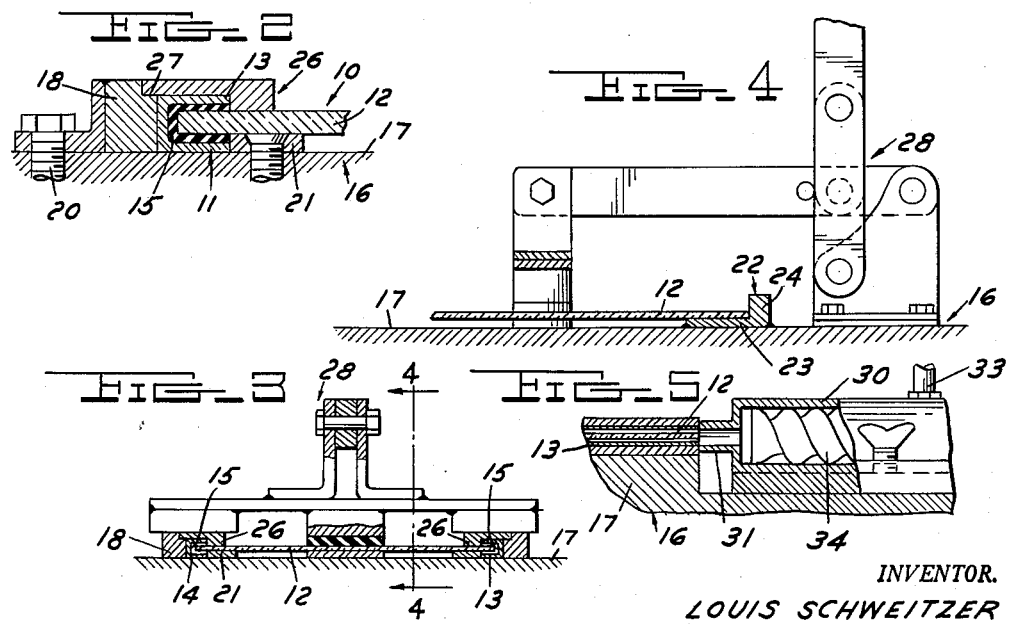
INVENTOR.
LOUIS SCHWEITZER
BY
ATTORNEYS United States Patent Office 2,718,664
Patented Sept. 27, 1955

2,718,664

APPARATUS FOR SETTING THE GLASS IN ITS FRAME

Louis Schweitzer, Royal Oak, Mich., assignor to Motor Products Corporation, Detroit, Mich., a corporation of New York Application January 3, 1950, Serial No. 136,464

2 Claims. (Cl. 18—30)

This invention relates generally to window assemblies of the type having channel-shaped frames and also refers to an improved method and apparatus for setting window panels in channel-shaped frames.

One use of this invention is in the production of vehicle body ventilating window assemblies having a channel-shaped frame open at the rear side and having a panel seated within the channel of the frame. In the fabrication of such window assemblies, it has been the practice to slide the panel into the frame channel through the open rear side of the frame and to seal the marginal edges of the panel with a strip of sealing material. The strip of sealing material is ordinarily placed around the marginal edges of the panel just prior to inserting the panel into the frame channel and is subsequently trimmed to provide a neat appearance.

The sealing strip is rather awkward to handle in production, and requires either a large personnel or complicated expensive machinery. In either case the strip is frequently improperly installed, and reworking of the assembly is required.

It is an object of this invention to eliminate the sealing strip and accompanying disadvantages by setting the marginal edges of the panel in the frame channel with a plastic sealing compound. In accordance with this invention the compound is injected or caused to flow into one or both ends of the channel frame after the panel is installed, so that the clearance space around the marginal edges of the panel in the channel frame is filled with the plastic compound.

It is another object of this invention to provide a relatively simple apparatus for carrying out the several steps of the method of setting the panel within the frame.

The foregoing as well as other objects will be made more apparent as this description proceeds, especially when considered in connection with the accompanying drawing, wherein:

Figure 1 is a top plan view partly in section of one type of apparatus that may be successfully used to carry out the method of setting the window panel in its frame;

Figure 2 is a sectional view taken on the line 2—2 of Figure 1;

Figure 3 is a sectional view taken on the line 3—3 of Figure 1;

Figure 4 is a sectional view taken on the line 4—4 of Figure 3; and

Figure 5 is a sectional view taken on the line 5—5 of Figure 1.

As shown in Figure 1 of the drawing, a ventilator window 10 of the type commonly used in connection with vehicle bodies is selected for the purpose of illustrating the present invention. The ventilating window 10 comprises a frame 11 and a transparent or glass panel 12. The frame 11 is open at the rear side and has a bottom bar 13 and a front bar 14. The bottom bar 13 extends forwardly from the rear open side of the frame and the front bar 14 is curved upwardly and rearwardly from the front end of the bar 13 to the rear side of the frame 11. Both of the frame bars are channel shaped in cross section and cooperate to provide an inwardly opening channel 15 which extends continuously from the rear end of the bottom bar 13 to the corresponding end of the front bar 14.

The glass panel 12 corresponds generally in shape to the frame 11, and is inserted into the frame through the open rear side of the latter. The marginal edge portions of the glass panel 12 adjacent the frame bars are received within the channel 15, and it will be noted from Figure 2 of the drawing that the width of the channel 15 exceeds by a substantial amount the thickness of the glass panel. The arrangement is such that when the glass panel 12 is in assembled relationship with the frame 11, a clearance space is provided between the inner surface of the channel 15 and the adjacent surfaces of the glass panel. In the present instance the clearance space noted above is filled with a plastic compound having the required adhesive characteristics to firmly hold the glass panel in place within the frame 11.

There are numerous different types of plastic or resin compounds available to the trade which may be satisfactorily used for this purpose. One type of plastic or paste that has been satisfactorily used as a base material is reclaimed rubber. Of course natural or synthetic rubbers may be used, but rubber reclaim is preferred because of its economical advantage. In any case the base rubber-like material is mixed with suitable fillers, antioxidents, age resistors and a solvent, such for example as petroleum naptha. This combination is compounded to a consistency suitable for injection into the clearance space provided in the channel 15 around the marginal edges of the glass; and after the solvent evaporates, provides a non-brittle filler or sealer which does not materially change either chemically or physically between temperatures of —50° F. and 150° F. Thus the compound remains indefinitely in a semiplastic condition within the above temperature range, and effectively holds the glass panel in position in the channel 15 of the frame 11. There are, of course, other materials or compounds which may be used, such for example, as a vinyl resin adhesive, and the present invention is not considered as limited to the specific plastic or resin.

In accordance with the present invention the frame 11 and glass panel 12 are relatively positioned in the manner shown in Figure 2 of the drawing to provide a clearance space between the inner surfaces of the channel throughout the cross sectional area of the latter, and the adjacent surfaces of the glass panel 12. After the glass panel 12 is properly centered or located within the channel 15 of the frame 11, the selected plastic composition or sealer is injected into the clearance space or channel 15 through opposite ends of the channel. As a result the clearance space in the channel around the marginal edges of the glass panel is filled with the plastic composition. The plastic composition adheres to both the glass panel and frame, and firmly holds the glass panel against displacement relative to the frame.

The foregoing will perhaps be more clearly understood from a description of one type of apparatus that may be used to carry out the several steps of the method. In detail the numeral 16 indicates a fixture having a base plate 17 and having a positioning block 18 supported on the top surface thereof. As shown in Figure 1 of the drawing, the block 18 corresponds in shape to the frame 11, and is engageable with the base of the channel 15 of the frame 11 to position the latter on the base 17. The block 18 is shown as secured to the base by brackets 19 having upright portions welded to the outer side of the block and having horizontal portions secured to the base by studs 20.

Secured to the top surface of the base 17 at the inner side of the positioning block 18 is a strip 21. This strip also corresponds in shape to the contour of the frame 11 and the inner surface of the strip is engageable with the inner edge of the bottom flange of the frame 11 in the manner shown in Figure 2 of the drawing. Thus the strip 21 cooperates with the block 18 to actually secure the frame 11 in position on the base 17 of the fixture.

The block 21 also serves as a rest for the adjacent portion of the glass panel 12, and positions the marginal edge of the panel midway between the side flanges of the channel 15. Referring now to Figure 4 of the drawing, it will be noted that a block 22 is secured to the base 16 at the rear edge of the glass panel 12 intermediate the rear ends of the frame bars 13 and 14. The block 22 has a portion 23 which extends beneath the glass panel 12 and cooperates with the strip 21 to support the glass panel 12 at the proper elevation with respect to the frame 11. The block 22 also has an upstanding part 24 which serves as a gage for locating the glass panel in proper spaced relationship to the base of the channel 15.

Referring again to Figure 2 of the drawing, it will also be noted that the strip 21 acts to close the opening between the bottom flange of the channel 15 and the adjacent bottom surface of the glass panel 12. The corresponding opening at the top of the glass panel 12 is closed by a member 26 recessed to receive the top flange of the channel and adapted to seat on a shoulder 27 formed on the positioning block 18. The member 26 is secured in place by a clamp 28 of the quick acting type. This clamp 28 is of conventional design and need not be described in detail herein.

From the foregoing it will be understood that the clearance space provided in the channel 15 around the marginal edges of the glass panel 12 is sealed throughout the length of the frame, and is open at the rear ends of the frame bars 13 and 14. The selected plastic or resin composition is injected into the clearance space through the openings provided at the rear ends of the frame bars. With this in view reference is made to Figures 1 and 5 of the drawing, wherein it will be noted that a pair of cylinders 30 are respectively supported on the base 17 of the fixture directly opposite the rear ends of the frame bars 13 and 14. Each cylinder has a discharge nozzle 31 at the front end thereof, and the nozzles are respectively registerable with the openings at the rear ends of the frame bars 13 and 14. If desired the cylinders 30 may be supported on the fixture by ways 32 in order to enable adjusting the cylinders to accurately locate the nozzles in proper relation to the rear ends of the frame bars.

Each cylinder has an intake opening 33 at the rear end through which the desired plastic composition may be inserted into the cylinders, and this material is fed axially of the cylinders to the discharge nozzles 31 by screw type feeders 34 respectively rotatably supported in the cylinders.

Thus from the foregoing it will be noted that I have provided a relatively simple method of setting a glass panel within a channel-shaped frame without the necessity of employing sealing strips which are not only expensive but are difficult to handle in production. It will also be understood from the foregoing that the method may be carried out with apparatus composed of a relatively few parts and capable of being operated with a minimum personnel.

What I claim as my invention is:

1. Apparatus for setting a window panel in a frame open at one side to receive the panel and having a frame bar comprising a base and laterally spaced legs projecting inwardly of the frame from one side of the base to define a channel for receiving the marginal edge portions of the panel, comprising a fixture for supporting the frame, means on said fixture for supporting the panel relative to the frame with the marginal edge portions of the panel received in the channel to provide a U-shaped clearance space between said channel and marginal edge portions, sealing strips supported on said fixture in spaced apart relation and positioned to lie on opposite sides of the panel when the latter is supported as aforesaid, said sealing strips each having first portions engageable with the adjacent side of the panel and having second portions engageable with the end of the adjacent leg to close the openings to the clearance space at opposite sides of the panel, said second portions assisting in positioning the frame on said fixture and said first portions assisting in supporting the panel relative to the frame as aforesaid, and means supported on the fixture opposite one end of the channel for introducing a plastic sealer within said clearance space.

2. The apparatus set forth in claim 1 in which injecting devices are respectively supported on the fixture in registration with the opposite ends of the channel for injecting a plastic sealer into the clearance space, said injecting devices being constructed and arranged to inject the sealer into the clearance space in directions extending lengthwise of the channel at the respective points of injection.

References Cited in the file of this patent

UNITED STATES PATENTS

| | | |
|---|---|---|
| 1,638,002 | Lynn | Aug. 2, 1927 |
| 2,031,786 | Oldham | Feb. 25, 1936 |
| 2,041,094 | Simpson | May 19, 1936 |
| 2,048,605 | Fisher | July 21, 1936 |
| 2,132,783 | Goldmark | Oct. 11, 1938 |
| 2,402,717 | Winer | June 25, 1946 |
| 2,434,557 | Fox | Jan. 13, 1948 |
| 2,470,089 | Booth | May 17, 1949 |
| 2,475,267 | Winegar | July 5, 1949 |